May 12, 1970 D. F. SMITH 3,510,939
COIL DEVELOPING METHOD
Filed April 2, 1969 8 Sheets-Sheet 7
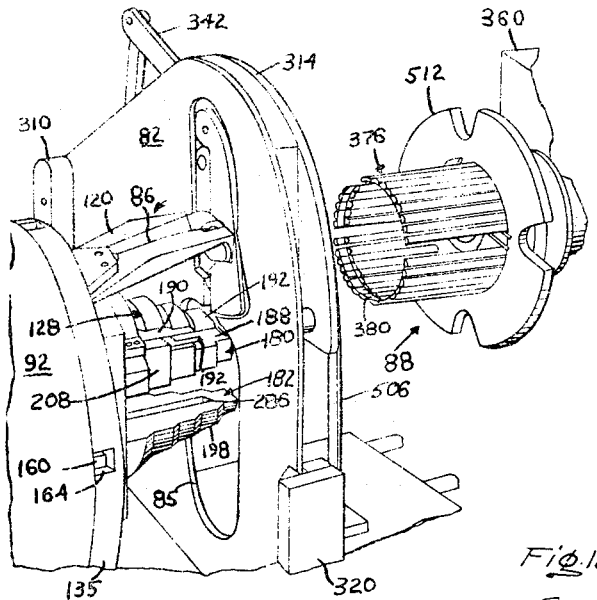
Fig.12
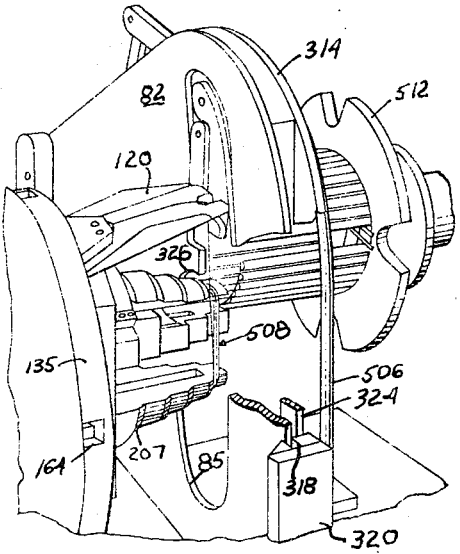
Fig.13
Fig.18
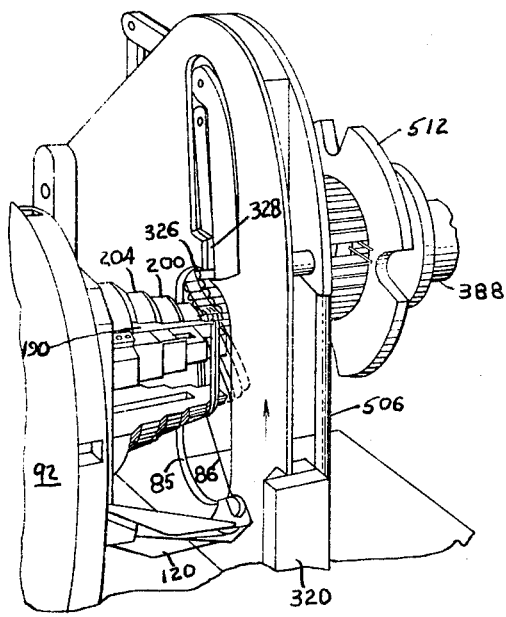
Fig.14
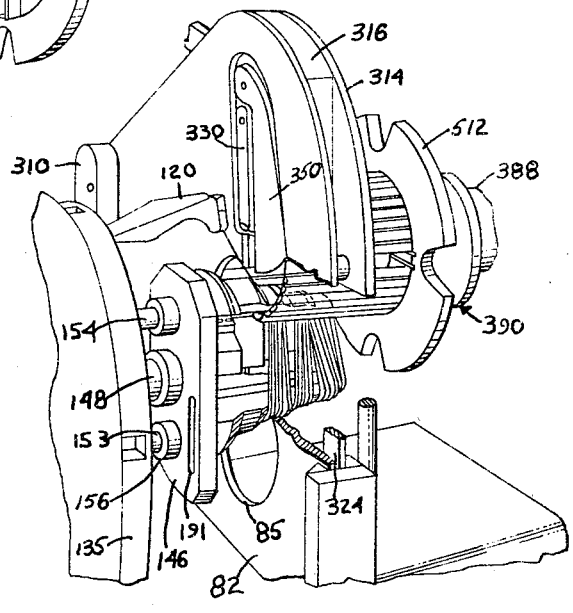
Fig.15
INVENTOR.
Dallas F. Smith
BY John M. Stoudt
Attorney

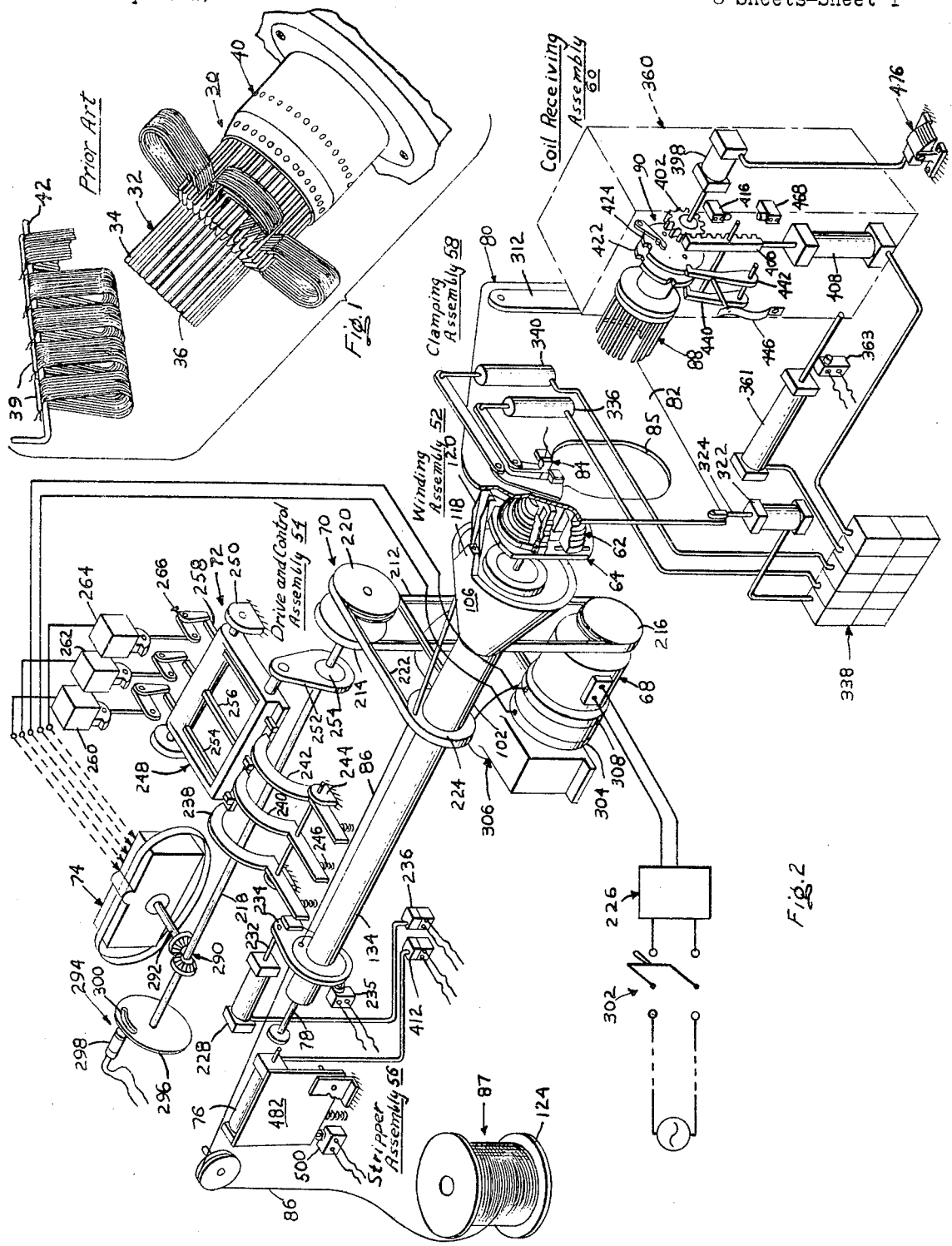

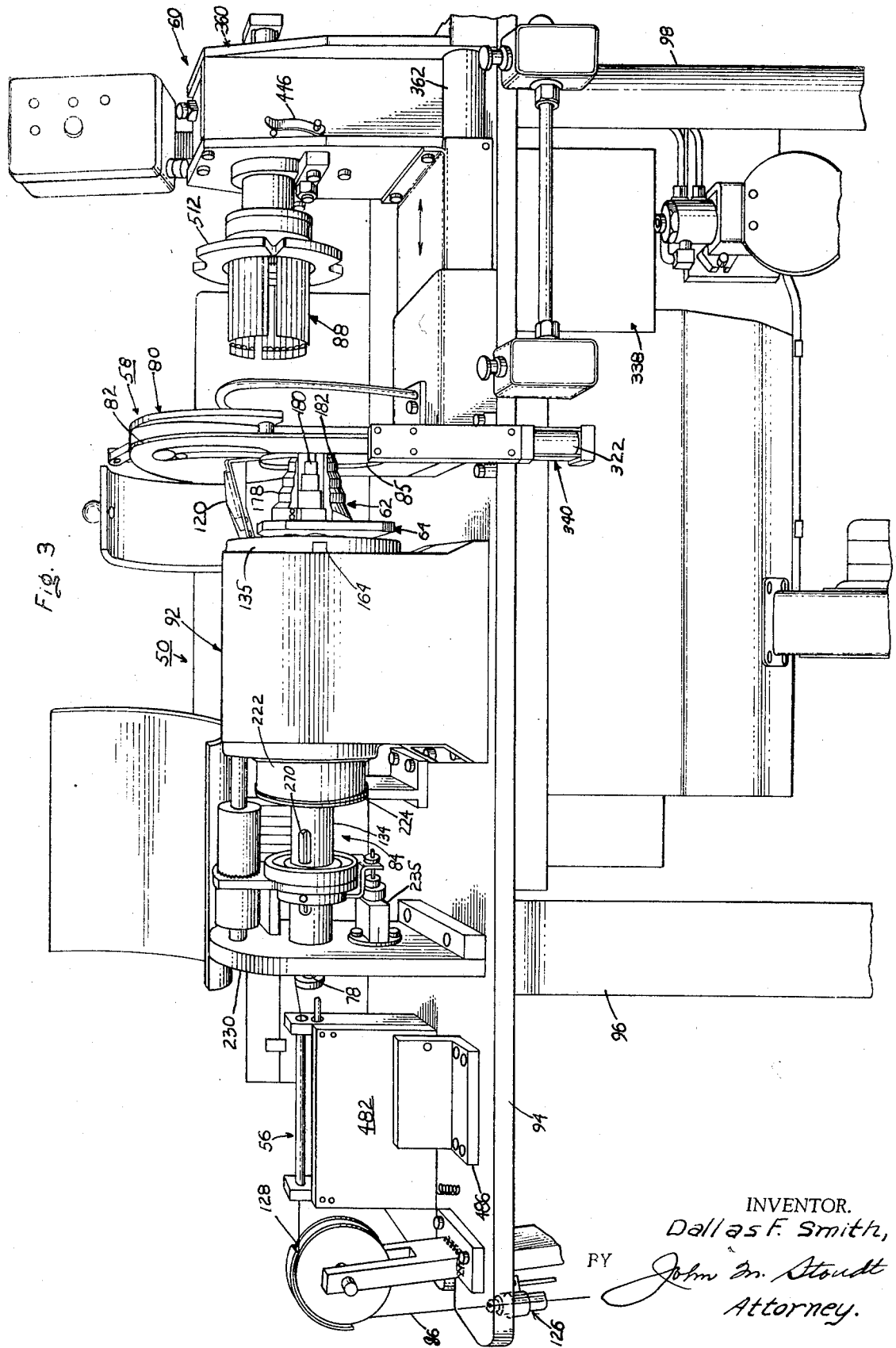

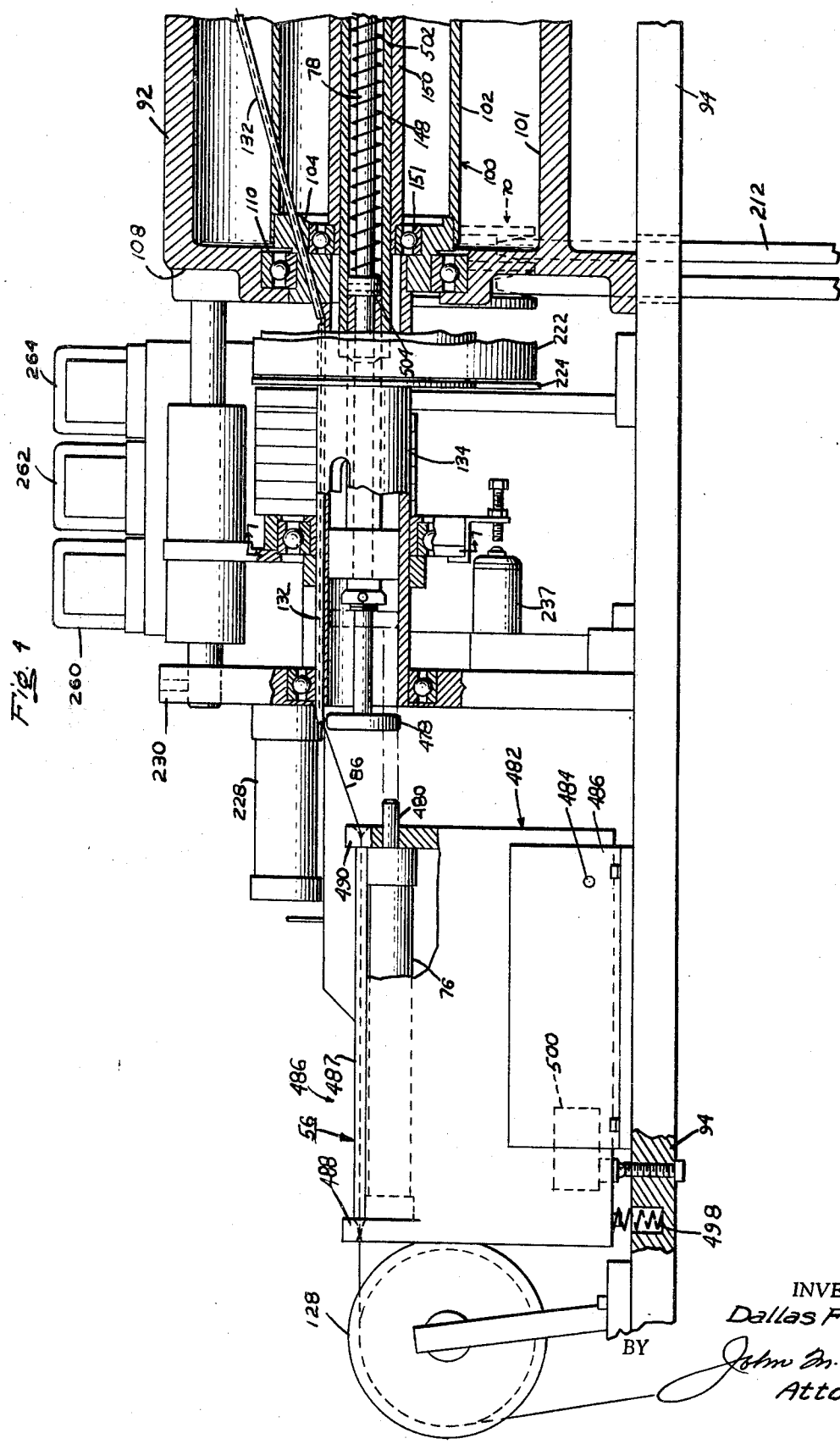

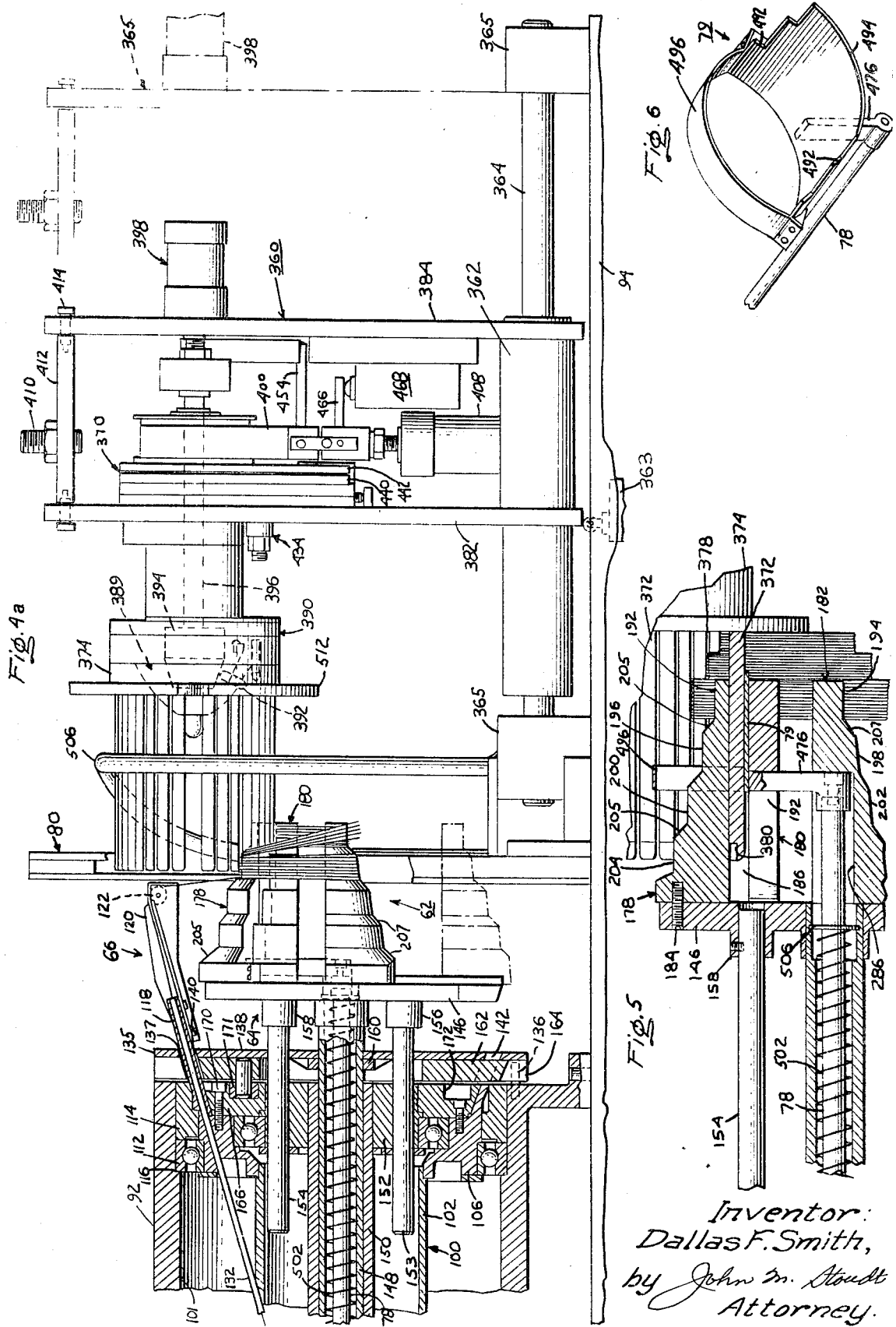

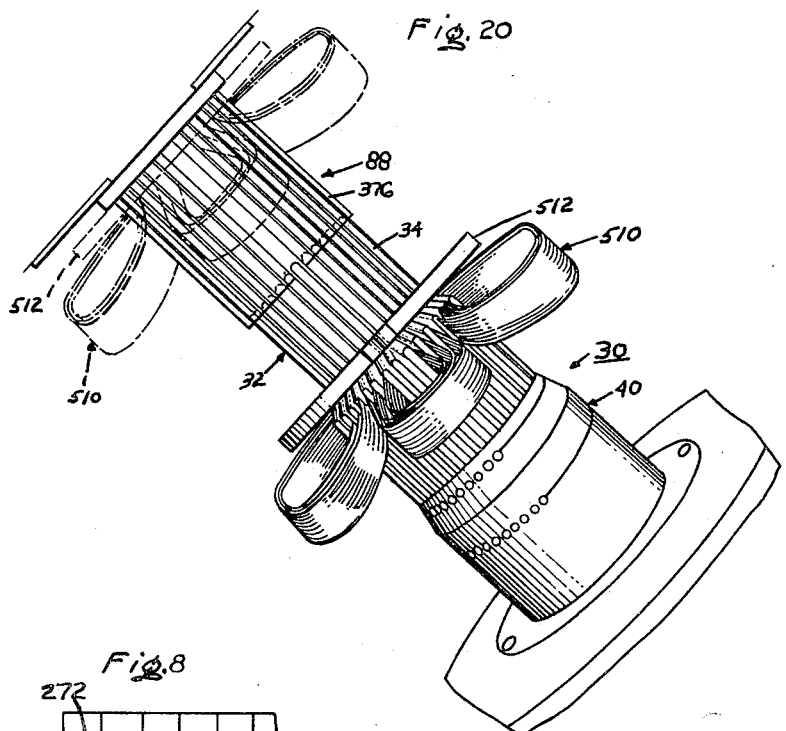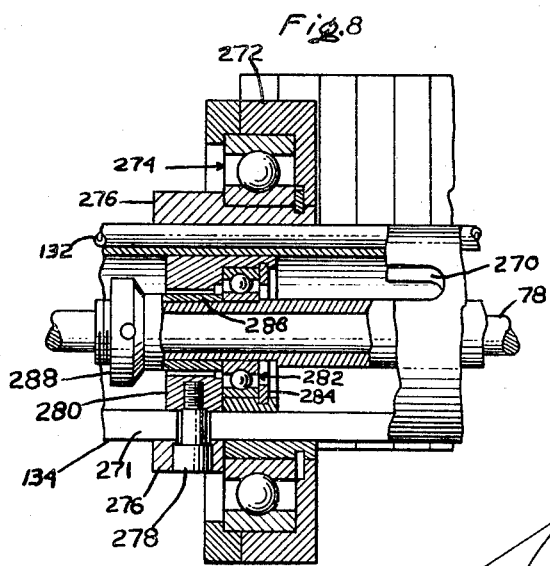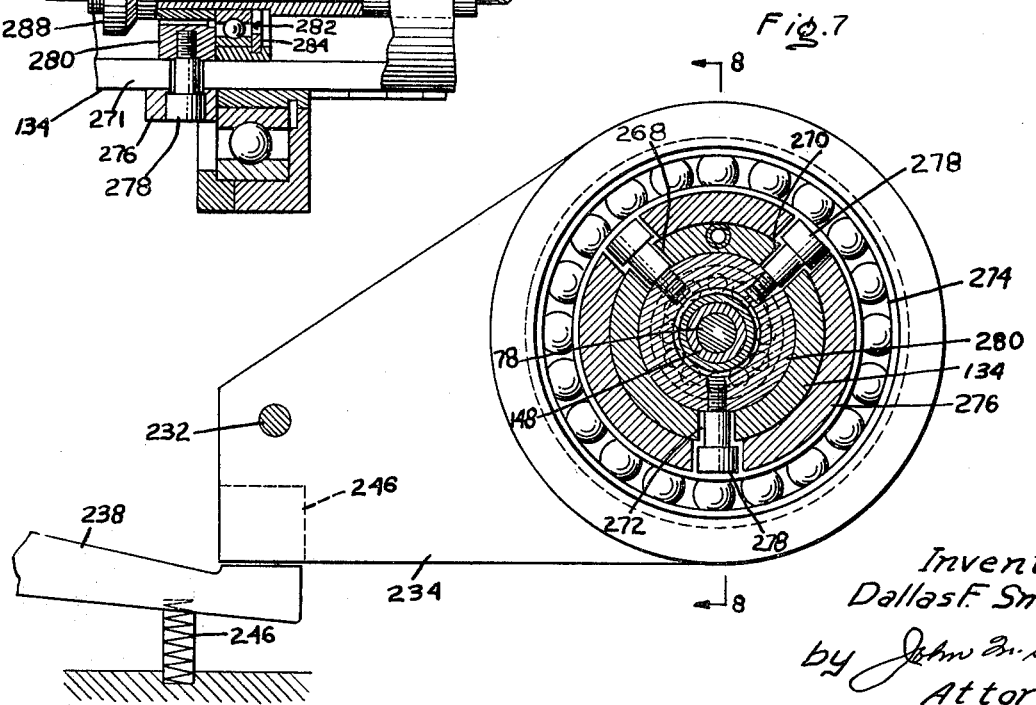

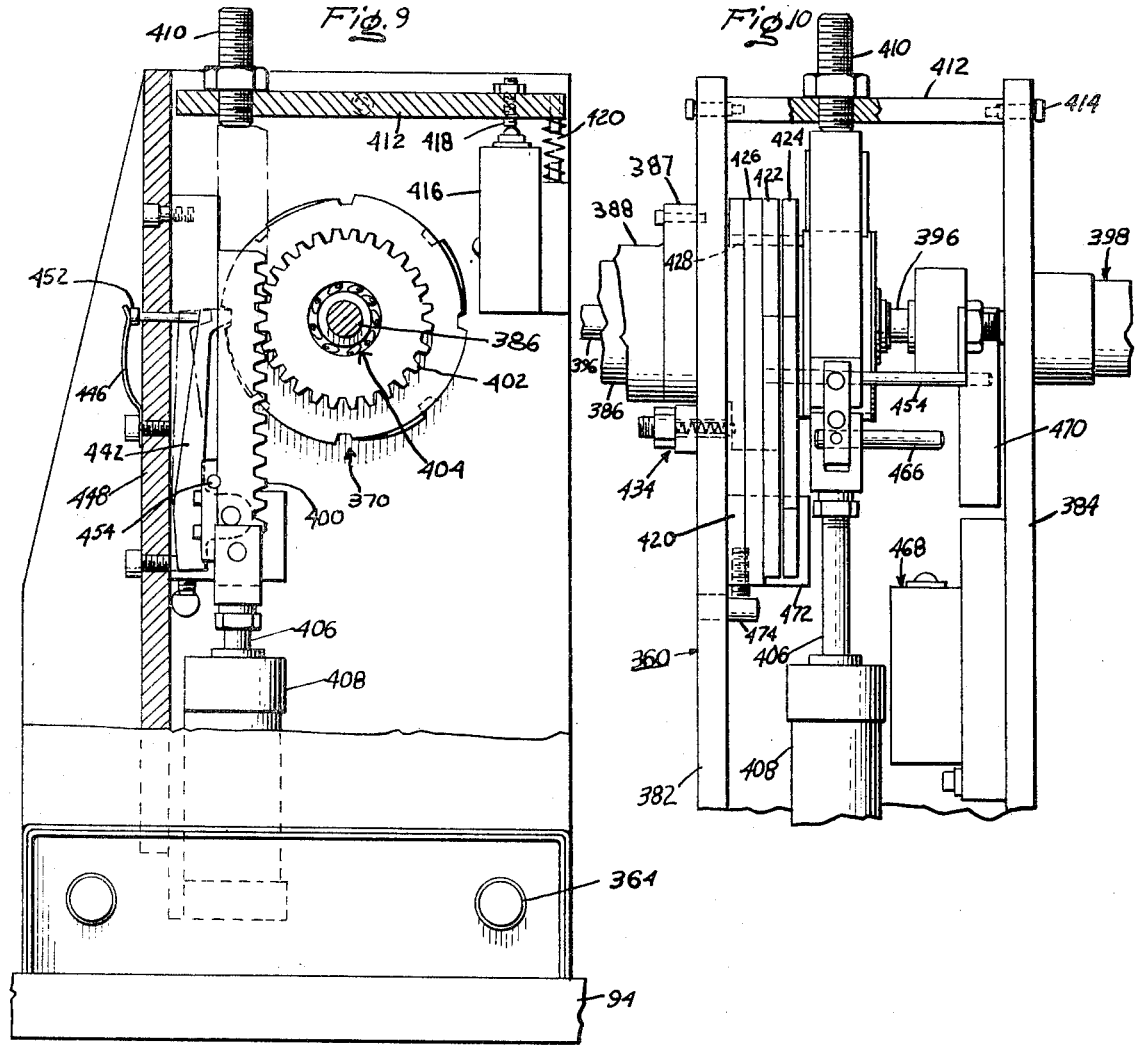
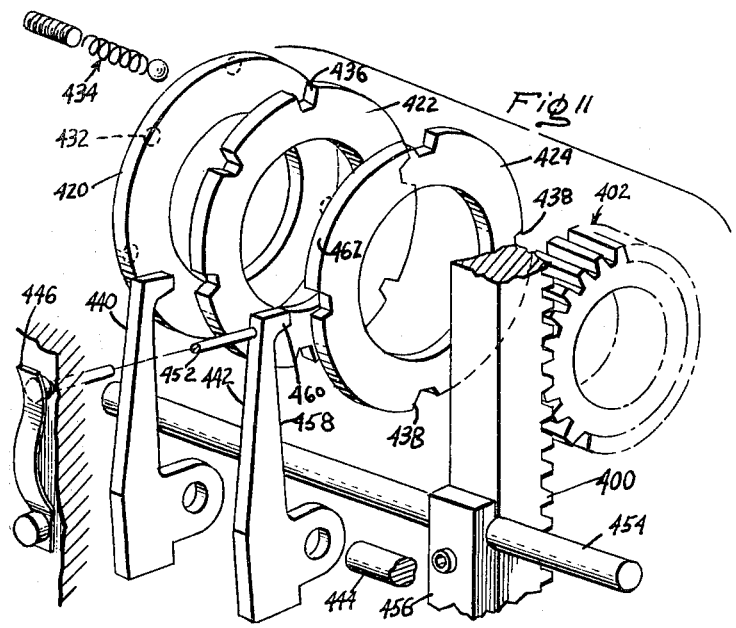

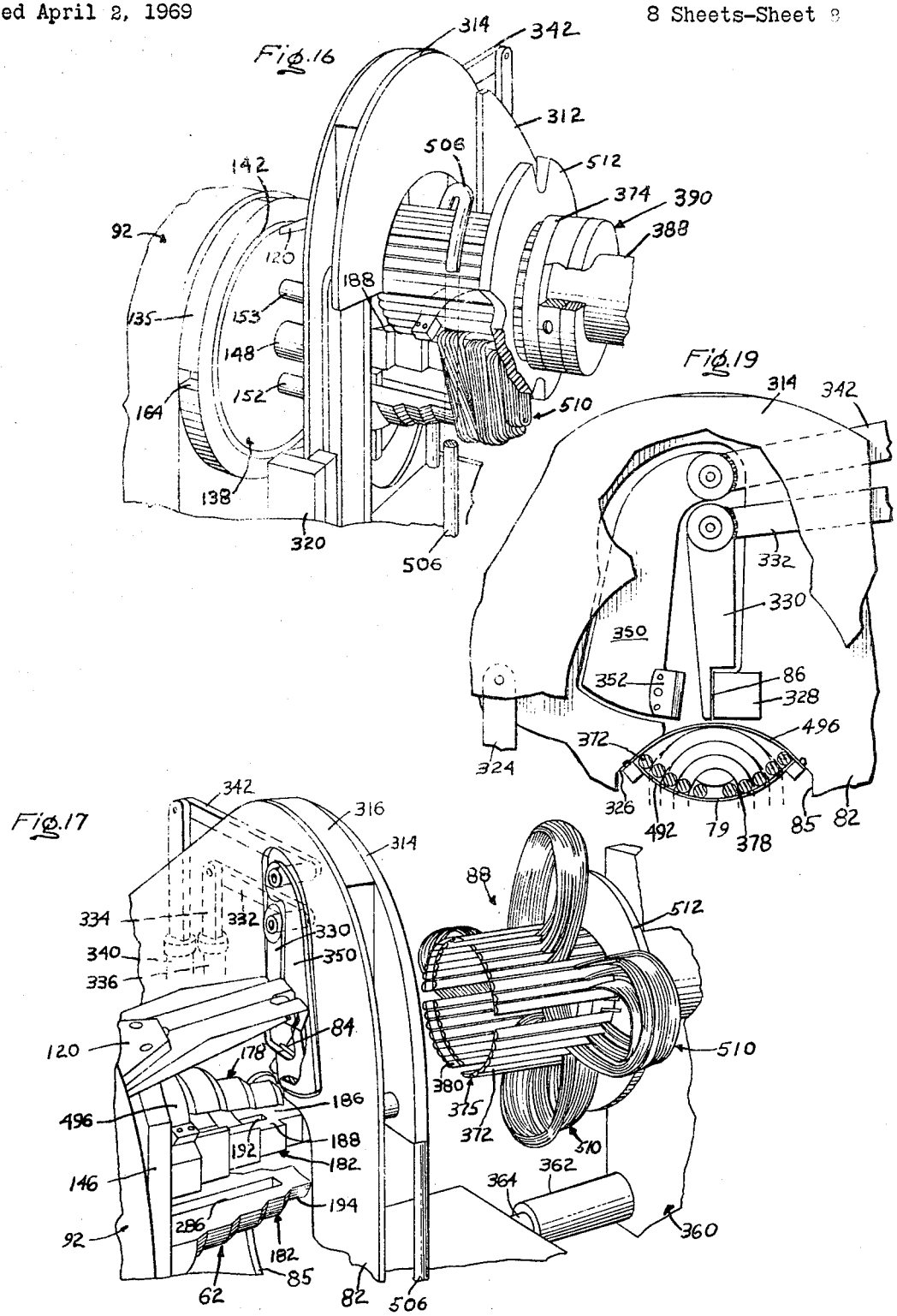

United States Patent Office

3,510,939
Patented May 12, 1970

3,510,939
COIL DEVELOPING METHOD
Dallas F. Smith, Fort Wayne, Ind., assignor to General Electric Company, a corporation of New York
Continuation-in-part of application Ser. No. 594,462, Nov. 15, 1966. This application Apr. 2, 1969, Ser. No. 812,650
Int. Cl. H01f 7/06
U.S. Cl. 29—605   6 Claims

ABSTRACT OF THE DISCLOSURE

Method for developing wound coil groups for ultimate placement into slots of electromagnetic cores. A noncollapsing, multistage, coil form has a number of different size coil-forming stages on which turns of electrically conductive wire are wound by a reversibly rotatable flyer assembly into serially connected coils of different sizes as some of the turns are being transferred into a coil-receiving assembly. During the winding of the turns, the tendency of the wire to oscillate is reduced as it is being held. At least some of the turns are automatically transferred into the coil-receiving assembly as other turns are being wound in the same coils, all of the turns being transferred from the multistage coil form without need for collapsing the form. The coil-receiving assembly and coil form are indexed relative to one another at the proper time to accommodate all coil groups in a given winding. In this way, the same noncollapsing form and coil-receiving assembly may be employed in the automatic development of a number of coil groups of the same winding with reduced tendency for turns to cross over and with rather short interpole wires being permitted between coil groups. The method may be efficiently and rapidly practiced, is versatile, and is capable of use in connection with a wide range of core and wire sizes.

Cross-reference to related application

This application is a continuation-in-part of my co-pending U.S. application Ser. No. 594,462 filed Nov. 15, 1966.

Background of the invention

This invention relates generally to a coil developing method used to develop windings in electromagnetic devices. More specifically, the disclosure relates to a method of developing wound coils and subsequent placement of the wound coils into stator cores. The method is especially useful for automatically winding two or more coil groups each having two or more distributed coils and for transferring all of the wound coil groups to enable an entire stator winding to be placed in the tooling section of a coil injection machine.

One approach of developing coils in electrical inductive or electromagnetic devices such as electric motor stators is by initially winding the coils and then subsequently inserting the coils into the slots of the device. By way of example, one machine which has been used for placing coils in electrical inductive devices is the so-called coil injection machine, which is illustrated in FIG. 1 and labeled "Prior Art." This machine has found extensive use, by way of illustration, throughout the motor manufacturing industry for injecting coils axially into the slots of stator cores, in view of its many attributes; e.g. achieves slot space factors of approximately 50%.

The coil injection machine is not, of course, a winding machine and therefore the coils of wire must somehow be wound prior to use therewith. A typical and probably one of the more common ways used prior to the present invention for winding coils for the coil injection machine is a relatively simple winding machine which merely winds coils about a collapsing arbor or coil form, the arbor and winding means being moved relatively to each other thereby forming a level or single layer winding. After the coils are wound on the arbor, the arbor collapses into a smaller cross-sectional configuration enabling the coils to be removed. These wound coils may then be clipped or taped to prevent misplacement of the turns prior to being loaded in the coil injection machine and are inserted as required into the tooling section of the coil injection machine.

There are several problems attendant to the use of coils wound on such winding machines. For example, it is important to prevent any misplacement of the coil turns after they are wound, as the individual turns preferably should remain in level or single layer configuration in order to enable them to be placed through slot entrances of the magnetic core. Coils obtained from such prior art winding machines, however, often have turns misplaced and in some cases require a highly skilled operator. An additional deficiency of such winding machines used to form windings for coil injection machines is that the coils of a coil group are all wound in the same direction. Thus, the operator when hand inserting the coil groups in the injection machine must reverse alternate coils to insure that alternate poles are of opposite polarity.

Another problem which may occur when using existing winding machines as a source for windings used in the coil injection machine is that it may be necessary to make interpole connections between coil groups or poles. For example, in certain existing winding machines, each group may be wound separately rather than being wound from a continuous strand of wire. Thus, in order to load a four-pole type coil injection machine in one manner practiced in the prior art, each of four coil groups is separately fanned out and hand inserted into the coil injection tooling with the proper polarity after being hand removed from a winding machine and taped or clipped. Then, after injecting the coil groups, it may be necessary to make interpole connections between coil groups or poles or as in some other approaches, the connections, if of unitary construction, are unusually long.

Consequently, it is quite desirable to provide economy and improved method for developing coil groups and placing them into coil-receiving means. For instance, apparatus and methods should be provided which enable coil groups to be disposed in coil-placing type equipment, e.g., a coil injection machine, rapidly, efficiently, and automatically while eliminating any manual handling of the coil groups or need for collapsing of arbors. It is also quite desirable to provide an arrangement which produces coil groups having less crossover turns than before, shorter interpole connections, and one which overcomes at least some, if not all the problems mentioned above.

Summary of the invention

Accordingly, it is a general object of the present invention to provide an improved method of developing coil groups for installation in electrical inductive devices.

Another object of the present invention is to provide an improved method of developing at least one coil group in a coil receiving assembly.

It is another more specific object of the present invention to provide an improved coil developing method which enables coil groups to be expeditiously wound and placed in the tooling of a coil injection machine while overcoming at least some of the deficiencies and providing some of the desirable features mentioned above.

It is yet another object of the present invention to provide coil developing method which automatically winds two or more coil groups or poles from a continuous strand of electrically conductive wire and automatically prepares the coil groups for subsequent expeditious disposition of the coil groups in the tooling section of coil-placing equipment.

It is a still further object of the present invention to provide an improved method for automatically winding a plurality of level wound coils each comprising a plurality of serially connected concentric coils of the proper polarity and having extremely short interpole wires with few, if any, crossover wires in a transfer device to enable the coil groups to be subsequently loaded into the tooling section of a coil injection machine without disturbing their arrangement.

In accordance with one aspect of the invention, in one form thereof, I provide a novel coil developing method for developing coil groups and preparing them for subsequent placement into a suitable coil-receiving assembly, for example, coil-placing type equipment, such as a coil injection machine.

In carrying out this aspect of the invention in one form, an end of wire is clamped adjacent a first step of a noncollapsible multi-step coil form, and several turns of wire are wound on the first step in a first direction. The clamp is then released and moved out of the path of travel of the coil form. Subsequently, an additional predetermined number of turns of wire are wound on the first step to form a first wound coil. At least some of the turns are concurrently forced into a coil-receiving assembly disposed next to the coil form as the first wound coil is being developed. The coil form is then moved to locate a second, larger step into turn-receiving position, and thereafter a predetermined number of turns is wound upon the second step to form a second wound coil serially connected with and larger than the first wound coil. The first and second wound coils are finally transferred into the transfer device. This procedure is repeated as dictated by the number of coil groups it is desired to form.

Brief description of the drawings

The subject matter which I regard as my invention is particularly pointed out and distinctly claimed in the concluding portion of the specification. The invention itself, however, taken with further objects and advantages thereof, may be best understood by reference to the following description taken in conjunction with the accompanying drawings in which:

FIG. 1 is a partial perspective view of a conventional coil injection machine of a type which is well-known in the prior art and presently in use, illustrating one manner in which the machine was loaded with coils as practiced in the prior art;

FIG. 2 is a simplified schematic perspective view of one form of coil-developing apparatus capable of practicing the preferred method, with self-explanatory legends identifying the various assemblies incorporated in the exemplified apparatus;

FIG. 3 is a view of one form of apparatus capable of practicing the preferred form of the method, partially in side elevation and partially in perspective;

FIGS. 4 and 4a together comprise an enlarged detailed longitudinal view of the apparatus illustrated in FIG. 3, with certain parts illustrated in section and other parts in full;

FIG. 5 is an enlarged view, partially in section and partially in full lines, of the coil form and coil-receiving assembly in the form of a transfer magazine illustrated in FIGS. 2, 3 and 4a of the exemplification;

FIG. 6 is an enlarged perspective view of a portion of a turn stripper assembly shown in FIG. 4a and 5;

FIG. 7 is an enlarged vertical sectional view taken substantially on the plane of the line 7—7 of FIG. 4;

FIG. 8 is a vertical sectional view taken substantially on the plane of the line 8—8 of FIG. 7;

FIG. 9 is a vertical sectional view taken substantially on the plane of the line 9—9 of FIG. 4a;

FIG. 10 is a vertical sectional view taken substantially on the plane of the line 10—10 of FIG. 9;

FIG. 11 is a partial exploded perspective view of several of the operating components of the coil-receiving assembly portion of the apparatus illustrated in FIGS. 9 and 10;

FIGS. 12–17 inclusive are partial perspective views of the coil form and transfer magazine of the apparatus showing a complete machine cycle wherein four serially connected coil groups, each comprising a plurality of serially connected coils, are developed in the transfer magazine;

FIG. 18 is a perspective view of the magazine stripper illustrated in FIGS. 12–17;

FIG. 19 is an elevational view, partially broken away, of a portion of the wire clamping assembly revealed in several figures of the drawing; and FIG. 20 is a partial perspective view illustrating the manner in which the coil groups from a loaded transfer magazine are transferred into the tooling section of the conventional coil injection machine of FIG. 1.

Description of the preferred embodiment

Referring again to the drawings and more particularly to FIG. 1, a prior art coil injection machine is illustrated, along with several taped or clipped coils located alongside the machine for loading of the tooling section of the coil injection machine in one manner practiced in the prior art. The coil injection machine illustrated in FIG. 1 is denoted generally by reference numeral 30 and includes a tooling section 32 which comprises a plurality of angularly spaced apart upstanding blades 34 defining slots 36, the blades 34 together forming a generally cylindrical cage for receiving coils to be subsequently injected into a stator core or the like. The coils to be loaded into the tooling section 32 are indicated at 38, and as is one approach in the prior art, these coils 38 have been wound on a simple collapsing arbor type winding machine in either single coils or entire, serially connected coil groups in the manner previously outlined. After being wound, the coils are taped or clipped at 39 in order to attempt to maintain the level or single layer configuration necessary for loading the coils into the tooling section 32 of the coil injection machine 30.

The coils must be in a level configuration for loading into the tooling section 32 as the slots 36 may be too narrow to receive more than a single wire. In this regard, it will be understood that the coil injection machine 30 takes different forms, the machine 30 in the exemplification of FIG. 1 being a four-pole machine while two-pole, six-pole and eight-pole machines are also used in the prior art. The common feature of all such machines is the blade and slot configuration of the tooling section 32 while the exact number, spacing and size of the blades and slots may vary. The machine 30 also includes a wedge-inserting section 40 which inserts slot wedges into the stator slots as the four coil groups or poles comprising the stator winding are axially injected into the stator slots.

It will be appreciated that the taped or clipped coils 38, which are normally supported on some type of rack 42 alongside the machine 30, must be hand inserted in the tooling section 32 by a time consuming, inefficient operation which requires the operator to fan out the upper portion of each coil group in order to achieve the level configuration necessary to place the coils into the slots 36. With this conventional coil injection machine and the manner of loading same in mind, reference may now be made to FIG. 2 of the drawing wherein I have illustrated, in schematic perspective form, one form of an apparatus which is capable of automatically winding two or more coil groups or poles in connection with a coil-receiving assembly illustrated as including a transfer magazine by the preferred form of my method in order to efficiently and quickly place the coil groups in the tooling section 32 of the coil injection machine 30.

General apparatus construction

I will initially describe the general construction of the machine in conjunction with FIG. 2 prior to describing the parts in detail. It will be observed that I have denoted the various assembly portions of the apparatus in FIG. 2 generally in accordance with their functions. The apparatus itself is denoted by numeral 50 and the various assemblies as a winding assembly 52, a driving and control assembly 54, a stripper assembly 56, a wire clamping assembly 58, and a coil-receiving assembly 60.

The winding assembly 52 includes, by way of example, a coil form 62 which is generally similar to that disclosed in the copending U.S. patent application Ser. No. 594,463 filed Nov. 15, 1966 of which I am a joint inventor. The coil form 62 is mounted on a jump assembly generally denoted by reference numeral 64 which, in conjunction with an appropriate mechanism in the driving and control assembly 54, moves the coil form intermittently, in longitudinal steps in order to locate the coil form in the winding path of a winding flyer which is generally denoted by reference numeral 66.

Suitable drive means in the form of a conventional drive motor 68 and a pulley group 70 for rotating the winding flyer 66 about the coil form 62 comprise one portion of the assembly 54. Also included in this driving and control assembly 54 is a mechanism generally denoted by reference numeral 72 for controlling the movement of the jump assembly 64 (and hence the coil form 62) and a well-known tape reader 74 for controlling the various mechanisms and elements in the machine. The mechanism 72, the flyer 66 and the tape reader 74 are coupled, via the pulley group 70, to the drive motor 68 in order to provide a direct mechanical relationship between the rotation of the flyer 66, the stepping of the coil form 62, and the control thereof by the tape reader 74. This arrangement, as will be seen below, provides a simple yet extremely effective means for coordinating the rotation of the flyer and the intermittent stepping of the coil form to the desired position relative to the flyer.

The apparatus 50 also includes the stripper assembly 56 having a stripper cylinder 76 mounted to actuate a stripper rod 78 which in turn has mounted on the forward end thereof a stripper plate 79. Upon actuation of the cylinder 76, the stripper plate 79 pushes the coils wound upon the coil form 62 from the coil form into the coil-receiving assembly 60.

Interposed between the winding assembly 52 and the coil-receiving assembly 60 is the wire clamping assembly 58 which includes a vertically oriented frame 80 mounted for pivotal movement in order to locate a clamp means 84 adjacent the coil form 62 thereby to hold one end of a continuous strand of electrically conductive wire 86 adjacent the coil form 62 while the winding flyer 66 begins its rotation about the coil form 62. A masking plate 82 at the front of the frame 80 has an opening 85 therein which permits the coil form 62 to pass therethrough and provides means for controlling oscillation of the wire 86 as it is being withdrawn from the wire source 87 and placed upon the coil form 62. The clamp means 84 also is useful for effectively reducing the wire length between groups of coils formed upon the coil form 62.

The coil-receiving assembly 60 may be shifted from the withdrawn position indicated in FIG. 2 to a forward position (FIG. 4a) wherein in the exemplification a transfer device or magazine generally denoted by reference numeral 88 is located in position adjacent the opening 86 in the masking plate 82 to receive coils from the coil form 62. Also provided is an arrangement for indexing coil form 62 and coil-receiving assembly 60 relative to one another. As shown, coil-receiving assembly 60 has an indexing arrangement 90 for indexing or rotating the transfer magazine at selected times during the machine cycle in order to locate empty coil-receiving means of the transfer magazine 88 into position to receive coils from the coil form 62.

Winding assembly

The winding assembly 52 will now be described in detail in conjunction with FIGS. 3, 4, 4a and 5 of the drawings in particular. The assembly 52 is mainly contained within a winding head or housing 92 which, in turn, is mounted on a base or bed 94 of the machine. The bed 94 is supported in a conventional manner by legs 96 and 98. The winding housing 92 comprises a generally cylindrical hollow member defining a chamber 101 with an elongate spindle means 100 mounted in the chamber. The spindle means 100 comprises an elongate hollow tubular member 102 which is supported between a rear spindle block 104 and a front spindle block or head 106, the member 102 extending substantially the entire length of the housing 92. The rear spindle block 104 is mounted for rotation in an opening in the rear wall 108 of the housing 92 on a bearing 110 mounted in the opening for this purpose. Similarly, the spindle head 106 is mounted for rotation in a bearing 112 adjacent the open front end of the housing 92 with an annular ring 114 being provided in order to retain the bearing 112 within the housing against an internal shoulder 116.

The spindle means 100 is rotated by the drive motor 68 and the pulley group 70 in order to carry the winding flyer 66 in a generally circular path about the coil form 62 and serves to feed wire onto the form in a single plane generally perpendicular to the direction of movement of the form. In this regard, the spindle head 106 takes the form of a hollow truncated cone (FIGS. 2, 4a) with the larger end at forward end of the housing 92. Extending from the cone-shaped spindle head 106 is a projecting portion 118 which extends outwardly beyond the end of the housing 92 and upon which the flyer 66 is mounted. The flyer 66 includes a flyer head portion 120 having a wire guide or roller 122 in the forward end thereof in order to change the feeding direction of the wire 86 into the single plane as it is withdrawn from the wire source 87 and wound upon the coil form 62.

The electrically conductive wire 86 is contained on a wire spool 124 (FIG. 2) comprising the wire source 87 which is positioned below the machine bed 94. The wire 86 is threaded through a conventional wire tensioning control device 126, over pulley 128, through the stripper assembly 56 and into a wire tube 132 which leads to the flyer head 120. The wire tube 132 is carried in a rear spindle tube or section 134 which is connected to the rear spindle block 104 and the wire tube 132 is thereby rotatable with the spindle tube 102. The wire tube 132 normally has a sufficiently large internal diameter for carrying the largest diameter wire to be used with the machine. In the exemplification, the internal diameter of the tube was approximately 0.160 inch, but as will be appreciated could be larger or smaller as desired. The wire tube 132 extends through the rear spindle block 104, through the wall of the spindle tube 102 into the housing chamber 101, through the spindle head 106, the projecting portion 118 of the head 106, and the tube 132 opening at the flyer head 120. It will be readily apparent that when the spindle means 100 rotates, the wire tube 132, carrying the wire 86, and of course, the flyer head 120 will rotate about the longitudinal axis of rotation of the spindle tube 102.

Since it is desired to wind turns of the wire 86 on the coil form 62 by means of the winding flyer 66, it is necessary to maintain the coil form 62 in a relatively stationary position with respect to the flyer head 120. A stationary locating ring 135 connected to the housing 92 at 136 is provided as a ground or a means to locate the coil form 62 with respect to the housing 92 in order to prevent rotation thereof. The locating ring 135 is an annular member having an inclined inner surface 137 corresponding to the angle of the spindle lead projecting portion 118 carrying the flyer 120. This surface 137 together with a locator plate 138 which has a similarly inclined outer peripheral edge 140 defines an annular track 142 in which the projecting portion 118 moves. Thus, the flyer head 120 rotates with respect to the housing 92 and ring 135.

The coil form 62, on the other hand, is mounted on the front mounting plate 146 of the jump assembly 64. The plate 146 is connected to the forward end of an elongate, hollow jump tube 148 which extends through the housing 92, being located centrally within the spindle tube 102. The jump tube 148 is slidable within a stationary spacer tube 150 which is mounted between a bearing block 152 at the front end of housing chamber 101 and the rear spindle block 104 with a bearing means 151 therebetween. The bearing block 152 has opposed longitudinally extending openings therein for receiving guide rods 153, 154 which are mounted respectively in bosses 156, 158 at the rear side of the plate 146. The bearing block 152 is fixedly connected to the spacer tube 150 by welding or the like and is also fixed to the locator plate 138 by suitable connecting means.

In order to prevent rotation of the coil form 62, it is necessary to prevent rotation of the bearing block 152 which carries the guide rods 153 and 154, which in turn carry the plate 146 upon which the coil form 62 is mounted. The locator plate 138 is rendered immobile by the stationary locating ring 135. Since the annular track 142 separates the locating ring 135 from the locator plate 138, and the projecting portion 118 of the spindle head 106 moves therein, it is necessary to use a pair of shuttle bars 160 and 162 to connect the ring 135 and plate 138. The shuttle bars 160 and 162 are carried within grooves in the locator plate 138 and are adapted to engage notches 164 in the locating ring 135. The notches 164 are located every 90 degrees about the locator ring 135 for alignment with opposed ends of the crossed shuttle bars 160 and 162. In order to move the shuttle bars into the notches while still allowing the flyer to rotate, I have provided a cam plate 166 which is fixedly mounted as by the studs 170 to the front end of the spindle head 106 for rotation therewith.

Each shuttle bar 160 and 162 has mounted thereon as by a pin 170 a cam block 168, and the cam blocks 168 ride within a cam track 172 in the cam plate 166. As the cam plate 166 rotates with the spindle head 106, the cam track 172 will cause the shuttle bars 160 and 162 to oscillate in synchronization with the flyer movement, wherein at least one end of one bar is always engaged in a notch 164 of the locating ring 135 and the plate 138 is held stationary. By this construction, the coil form 62 is held stationary while the flyer head 120 rotates thereabout in order to place or generate turns of wire on the coil form.

Now, bearing in mind that the winding flyer 66 rotates about the coil form 62 while the coil form is prevented from rotating, the specific construction of the coil form and its relationship to the winding flyer will be considered in more detail by referring to FIGS. 4a, 5, and 17 and the following description. The coil form 62 includes three discrete sections, an upper coil form section 178 (as viewed in the drawings), an intermediate coil form section 180, and a lower coil form section 182. The upper section 178 is affixed to the mounting plate 146 by the stud 184 and extends longitudinally forwardly thereof. The intermediate section 180 is also affixed to the plate 146 by suitable mounting means and is coextensive with the upper section 178 while being spaced therefrom in order to provide a generally arcuate slot 186 therebetween. The arcuate slot is defined by the concave upper face 188 of the intermediate section 180 and the convex lower face 190 of the upper section 178. The intermediate section 180 also includes a slot 192 therethrough in order to accommodate a coil stripper as will be explained hereinafter. The lower section 182 is inverted with respect to the upper section 178 and is adjustably mounted on the plate 146 which includes a pair of vertically extending slots 191 (FIG. 15) through which suitable mounting means such as bolts extend to adjustably mount the lower section 182 thereon. This allows the lower section 182 to be moved between the positions illustrated by the lines in full and the lines in phantom in FIG. 4a. The various positions of the lower section 182 permit different size coils to be formed, such as are required, for example, in stator stacks of different heights.

The three coil form portions or sections 178, 180, and 182 are stepped in order to provide a plurality of increasingly larger coil-forming stations, the exact number being dependent upon the desired number of coils having different spans. The upper and lower sections, for example, include at their leading ends a pair of opposed arcuate surfaces 192 and 194 respectively forming the smallest coil-forming station, a second pair of opposed arcuate surfaces 196 and 198 behind the first pair forming a second larger coil-forming station, a third pair of opposed arcuate surfaces 200 and 202 behind the second pair forming a third larger coil-forming station, and a final pair of arcuate surfaces 204 and 206 behind the third pair forming the final largest coil-forming station Each coil-forming station also includes an arcuate surface 205 on the upper coil form section 178 which is sloped with respect to the longitudinal direction of travel of the coil form 62. A corresponding inclined arcuate surface 207 is provided on the lower section 182 along with a pair of the stepped sides 208 of the intermediate coil form section 180. This configuration of the coil form 62 permits a plurality of single layer or level wound coils comprising a complete coil group to be formed without the necessity of the coil form 62 being continuously moved with respect to the flyer head 120, thereby dramatically simplifying the driving and control requirements of the apparatus.

Although for convenience in manufacture, the outer arcuate surfaces are solid in construction, the desired configurations could be furnished by other structures, such as suitably configured spaced apart pins or the like which provide an interrupted type outer surface.

As each coil of the coil group is formed with the wire 86 being wound upon a pair of opposed inclined arcuate surfaces 205 and 207 of each coil-forming station, succeeding turns of wire force or push preceding turns off the inclined surfaces forwardly onto the opposed arcuate surfaces. In actual practice, it has been found that by sloping the surfaces 205 and 207 at approximately 45 degrees to the longitudinal path of the coil form, the turns may be easily pushed forwardly in this manner. In addition, the arcuate portions 194, 198, 202, and 206 of the lower coil form section 182 are inclined at a slight angle to plate 146 (approximately 5 degrees) in order to permit the turns to readily slip from each coil-forming station as succeeding turns force them forwardly. The arcuate surfaces 192, 196, 200, and 204, on the other hand, are substantially perpendicular to plate 146. It will therefore be understood that the inclined surfaces 205 and 207 of the first, or smallest coil-forming station are located across the plane of travel of the flyer head 120 as the wire 86 is wound on these inclined surfaces, thus permitting such movement of the wire.

Drive and control assembly

The drive and control assembly, as the name implies, is provided not only to drive the various movable portions of the machine but also to control or coordinate the movement of these portions. In this regard, reference should be made to FIGS. 2, 3, 4, 7, and 8 and the following description in order to understand the various features of the drive and control assembly 54.

Referring initially to the schematic view of FIG. 2, it will be observed that the aforementioned drive motor 68 is connected to the pulley group 70 by a drive belt 212. As shown in diagrammatic form, the pulley group 70 includes a first pulley 214 connected by the belt 212 to the output pulley 216 of the motor 68, the pulley 214 being mounted on a shaft 218 which extends longitudinally along the machine bed 94, being coupled to the tape reader 74 and the jump control mechanism 72. A second pulley 220 is also mounted on the shaft 218 and connected by a drive belt 222 to a pulley 224 connected to the rear spindle block 104. Accordingly, as the motor output pulley 216 is driven, the rotatable spindle 100 is driven. The direction of rotation is controlled by a relay means 226 provided in the electrical circuit of the machine and operatively connected in a conventional manner to the tape reader 74.

The previously mentioned longitudinal stepping motion of the coil form 62 is also provided by the drive and control assembly 54. An air cylinder 228 is mounted on an upstanding plate 230 which, in turn, is mounted on the machine bed 94 rearwardly of the winding head assembly housing 92. The jump cylinder 228 includes the usual piston 232 which is connected to a yoke plate 234 which in turn is connected to the rear end of the jump tube 148 (FIGS. 7, 8). The jump cylinder 228 is a double action air cylinder controlled by a pair of conventional solenoid operated valves generally denoted by reference numeral 236 in FIG. 2. Thus, the cylinder 228 acts as a forward biasing means in one direction and a return means when reversed.

The control mechanism 72 for the coil form 64 is provided to impart longitudinal jumping or stepping motion to the coil form 62 in order to locate the coil-forming stations in turn-receiving position adjacent the flyer head 120. The control mechanism 72 includes three trip bars 238, 240, and 242, spaced the same distance apart as the distance between the coil-forming stations of the coil form 62. The trip bars are supported to pivot at 244 and are spring biased by the coil springs 246 in an upper locking position. In this position (FIG. 2), the first trip bar 238 engages a wear pad 246 on the yoke 234 preventing the jump cylinder 228 from moving the yoke 234 and the jump tube 148 forwardly. In this position of the jump tube, the first or smallest coil-forming station of the coil form 62 is in turn-receiving position adjacent the flyer head 120.

In order to allow the jump tube 148 to be intermittently stepped or jumped by the cylinder 228, it is necessary to move the trip bars out of the path of the yoke 234. The means for tripping the trip bars 240 is an oscillating arm 248 which is mounted for rotation about the supports 250 and oscillated by a linkage 252 which is connected to the shaft 218 by the eccentric 254. As the shaft 218 rotates in response to the drive motor 68, the eccentric 254 imparts an oscillatory motion to the arm 248. However, so long as the pins 254, 256, and 258, carried in the arm 248 remain withdrawn, the oscillation of the arm 248 does not affect the trip bars. Each trip bar is actuated as its corresponding pin is moved forwardly under the rear end of the trip bar, and as the arm 248 oscillates upwardly, the pin rotates a trip bar allowing the cylinder 228 to move the jump tube 148 and the coil form 62 forwardly to the next trip bar. The pins are actuated by solenoids 260, 262, and 264, corresponding to the pins 254, 256, and 258 and to the trip bars 238, 240, and 242 respectively. Each solenoid has its armature connected to a bell crank 266 and is controlled by the tape reader 74 to sequentially actuate trip bars 238, 240, and 242 in that order. The tape reader 74, illustrated schematically in FIG. 2, is merely one form of means for controlling the timing of the various elements in the driving-control assembly 54 and could be replaced, for example, by a solid state control device.

In order to ensure that the rear spindle tube 134 only rotates while the jump tube 148 only moves longitudinally, the tube 134 has three elongate slots 268, 270 and 272 therein (FIGS. 4, 7, 8). It will be seen that the yoke plate 234, which extends laterally adjacent the spindle tube 134 for engagement by the piston 232 of the cylinder 228, includes an annular portion 272 extending about the spindle tube 134. Mounted within the annular portion 272 in a bearing 274 is an outer sleeve 276 which rotates with the spindle tube 134 within the nonrotatable annular portion 272. Mounted within the spindle tube 134 and connected to the outer sleeve 276 by studs 278 which extend through the slots 268, 270, and 272 respectively, is an inner sleeve 280. The inner sleeve is rotatable on the bearing 282 which is retained in place by a snap ring 284. The inner race of the bearing 282 is mounted upon the nonrotatable jump tube 148 and retained therein by a collar 286 which is in turn retained in place by a set collar 288. This arrangement enables the spindle tube 134 to rotate between the jump tube 148 and the annular portion 272 of the yoke plate 234 both of which do not rotate, while the jump tube 148 and the stripper bar 78 carried therein together with the inner and outer sleeves 280 and 276 and the yoke plate 234 are movable longitudinally.

In the exemplification, as illustrated in FIG. 2, the tape reader 74 is driven from the shaft 218 through a right angle drive 290 to provide a direct mechanical linkage or relationship between the rotation of the flyer head 120 and the input shaft 292 into the tape reader 74, which shaft 292 therefore rotates each time the flyer head rotates. This direct mechanical linkage enables the tape reader 74 to count the exact number of revolutions made by the flyer head 120 as it winds, turns upon the coil form 62, and thereby coordinates the stepping motion imparted to the coil form 62 by the solenoids 260, 262, and 264 with the rotational position of the flyer head 120 in relation to the coil form 62. This coordination is essential since in order to be able to transfer the coil from the coil form 62 into the transfer magazine 88 the crossover wires or the wires leading from coil to coil must occur only in the lower three-quarters of each coil.

Also, the flyer head 120 must always stop slightly off top center in order to enable the clamp means 84 to operate. The position at which the flyer head stops is controlled by a proximity switch 294 which includes a proximity disc 296 mounted on the shaft 218 and a sensor element 298. The proximity disc 296 includes a slot 300 therein for indicating the rotational position of the disc to the sensor 298. Since the shaft 218 rotates in 1:1 relationship with the spindle 100 due to their common connection through the pulley group 70, by locating the disc 296 in any given stopping position, the flyer head 120 will thereby be correctly located. When the switch 302 is closed to energize the machine 50, the tape reader signals the drive motor 68 through the relay 226 to rotate in either a clockwise or a counterclockwise direction. At this time a clutch 304 is engaged to cause the motor output pulley 216 to rotate thereby rotating the flyer head 120, the shaft 218 and the disc 296, as well as the input shaft 292 to the tape reader 74. After a complete winding cycle, which as will be explained below includes the winding of a predetermined number of coils on the coil form 62, the tape reader signals the clutch 304 inactivating the drive motor 68 and engaging a gear motor 306 to the output pulley 216. The gear motor 306 rotates in the same direction as the drive motor 68 but at a much slower speed. In actual practice, one type of gear motor has been driven between 1200 and 1500 revolutions per minute to rotate the flyer head 120 at this speed, whereas the gear motor rotates at approximately 50 revolutions per minute. When the gear motor 306 is engaged, the output pulley 216 will then rotate at the slower speed slowing down the flyer head 120 and, of course, the shaft 218. The tape reader 74 again signals the clutch 304 disengaging the gear motor and turning over the exact stopping position of the winding flyer to the proximity switch 294. At a predetermined position of the disc slot 300 with respect to the sensor 298, a brake 308 is energized stopping the output pulley 216 within a few degrees of rotation, thereby locating the flyer head 120 in the proper position.

Clamping assembly

The upstanding frame 80 of the clamping assembly 58 is mounted between a pair of upstanding-mounting plates 310 and 312 so as to be rotatable by an air cylinder 322 controlled by a solenoid operated valve in the valve bank 338 (FIG. 2) mounted at 340 (FIG. 3) below the machine bed. The frame 80 includes the previously mentioned masking plate 82 and a back plate 314 spaced by suitable spacing means 316 from the masking plate 82. The forward edge of the masking plate 82 is slidably received in a vertical slot 318 in a frame guide 320 which is mounted on the machine bed 94. The air cylinder 322 is mounted below the machine bed 94 and includes a piston 324 connected to the masking plate 82 for moving the frame 80 between the positions illustrated in FIGS. 12 and 14.

With the frame 80 in its lower position (FIG. 12), the upper peripheral edge 326 of the opening 85 in the masking plate 82 is closely adjacent the first coil-forming station or the arcuate surface 192 of the upper coil form section 178. Also, and more importantly, the clamp means 84 is closely adjacent this arcuate surface. The clamp means 84, as will be seen in FIG. 19, for example, includes a fixed clamp block 328 and a movable clamp arm 330. The movable clamp arm 330 is connected by a linkage 332 to the piston 334 of an air cylinder 336 mounted between the plates 82 and 314. The cylinder is in turn connected to a solenoid operated valve in the valve bank 338. The clamp arm 330 is actuated through the linkage 332 for movement between clamping and unclamping positions with respect to the fixed clamp block 328 to periodically hold, during the winding cycle of the machine 50, one end of the wire 86 closely adjacent this first coil-forming station of the coil form 62.

Also mounted between the masking plate 82 and back plate 314 is a second solenoid valve controlled air cylinder 340 which is connected through a linkage 342 to a cutter arm 350. A cutter blade 352 is mounted on the arm 350 for cutting the wire 86 at an appropriate portion of the machine cycle.

The air cylinders 322, 336 and 340 are actuated in accordance with the program in the tape reader 74 at appropriate times in order to clamp and cut the wire 86. Thus, when the winding cycle of the machine 50 is to be initiated, the wire 86 is positioned in the clamp means 84 and the movable clamp arm actuated to clamp the wire as shown in FIGS. 12 and 19. At this time, the frame 80 is in its lower position with the wire held closely adjacent the first coil-forming station of the coil form 62. The wire end must be clamped, of course, when the flyer 66 rotates in order for turns to be placed about the coil form. When a sufficient number of turns of wire have been wound upon the first coil-forming station, the clamp arm is released upon a signal from the tape reader 74; and the cylinder 322 is simultaneously energized to raise the frame 80. In actual practice, it has been found that after approximately six to ten turns have been placed about the first coil-forming station the clamp arm 330 can be released, and the wire will not be pulled off the coil form as the flyer head 120 rotates. The frame 80 must be raised to the position shown in FIG. 14 so that the upper peripheral edge 326 of the opening 85 is above the largest coil-forming station or arcuate surface 204 since the coil form 62 is to be moved longitudinally through the opening 85. However, the edge 326 should not be too high as it, along with the remaining periphery of the opening 85, must engage the wire 86 as the flyer head 120 rotates about the coil form 62 to control undesirable oscillation of the wire. Hence, the opening 85 is shaped to provide means for preventing such oscillation.

It is extremely desirable to clamp the wire as closely as possible to the first coil-forming station since this will enable the interpole wires or the portion extending between coil groups to be as short as possible. After a complete coil group is wound on the coil form 62, the flyer is stopped off center by the proximity switch 294, and the wire 86 is thereby moved between the clamp block 328 and the arm 330. After the coil group is transferred into the magazine 88, the frame 80 is lowered and the clamp arm 330 is actuated prior to the next winding cycle, thereby to provide means for keeping the interpole wire quite short.

Coil-receiving assembly

The coil-receiving assembly 60 has a portion of the apparatus 50 located in position to receive one or more coil groups from the coil form 62. As illustrated, the coil-receiving assembly 60 includes an upstanding housing generally denoted by reference numeral 360, which is mounted by a pair of hollow guide shafts 362 upon a pair of longitudinally extending spaced guide rods 364. The guide rods 364 each extend between a pair of spaced mounting blocks 365. This arrangement enables the housing 360 to be moved by an air cylinder 361 (FIG. 2) between a forward position illustrated by lines in full in FIG. 4a and a rear position illustrated by lines in phantom, 365. The forward position of the housing 360 locates the transfer magazine 88 in coil-receiving position adjacent the back face of the masking plate 82, and a limit switch 363 is provided to indicate this forward position rendering inoperative the air cylinder 361.

An indexing arrangement, generally denoted by reference numeral 370 is provided for indexing the transfer magazine 88 in order to sequentially present two or more groups or sets of coil-receiving means of the magazine 88 in position to receive coil groups from the coil form 62. In this regard, the transfer magazine 88, as will be observed in particular in FIGS. 4a, 5, 17 and 19, comprises a plurality of elongate angularly spaced apart blades 372 of generally circular cross-section forming a cage 376. The blades of the cage 376 are mounted about a plate 374 and extend outwardly therefrom so as to define a generally cylindrical outer periphery. The blades 372 are equally spaced thereby forming a plurality of elongate slots 378 extending longitudinally along the cage. Each blade 372 also includes a notch 380 at the forward end thereof, thereby providing a circular portion at the front of the cage 376 of somewhat larger internal diameter than the remainder of the cage 376. These notches 380 are provided to enable the magazine 88 to seat on or mate with the tooling section 32 of a coil injection machine 30 for loading thereof in accordance with this invention.

When the transfer magazine 88 is in the forward position adjacent the back face of the masking plate 82, certain of the slots 378 are aligned with the edges of the various arcuate surfaces 192, 196, 200, and 204 of the upper coil form section 178 so as to receive the level wound coils formed on these various arcuate sections.

Thus, in FIGS. 4a, 5 and 19, for example, it will be seen that the turns of wire at each coil-forming station are in line with two opposed slots 378 of the cage 376. It is actually, however, only the portions of the coils immediately beyond the edges of each upper arcuate section which are in line with the slot pairs in the cage. It is necessary for the coil turns to be of single layer configuration as the cage slots 378 are normally not wide enough to accommodate more than a single wire thickness. This is why, as explained above, the crossover of wires between coils must occur only during the lower portion of the winding action of the flyer head 120. In FIG. 19, for example, it will be seen that the increasingly larger coils span four, six, eight and ten slots 378.

In the exemplification, the cage 376 of transfer magazine 88 is of the type adapted to receive four serially connected coil groups from the coil form 62, two coil groups having four serially connected coils and two groups having three serially connected coils (see FIG. 17). Thus, the exemplified magazine has twenty-eight slots 378 to accommodate these coil groups. It will be appreciated, of course, that the magazine may have either a greater or lesser number of slots for accommodating a different number of coil groups and/or coils. Also, the tooling section itself could be employed as the coil-receiving means of the coil-receiving assembly for directly accommodating turns from the winding form. The apparatus 50 is also capable of placing a coil group of two-pole and six-pole or greater configuration.

In the illustrated exemplification the magazine 88 is loaded by transferring coils from the coil form 62 into the cage 376. Thus, when the coil form 62 moves forwardly through the opening 85 in the masking plate 82, since the cylindrical cage 376 of the magazine 88 is immediately behind the masking plate 82, several of the blades 372 telescope into the slot 186 between the upper and intermediate coil form sections 178 and 180. The turns of each coil are therefore carried into the corresponding coil-receiving slots 378 of the cage 376 prior to actuation of the coil-transferring means. The index means has been provided to index or rotate the magazine so as to present empty slots 378 in coil-receiving positions whereby two or more coil groups can be loaded automatically and expeditiously. In this regard, a rotatable shaft 386 is provided to support the magazine 88, the shaft 386 lying within a sleeve 388 which is mounted by a flanged portion 387 on a wall 382 of the housing 360. Mounted on the front end of the rotatable shaft 386 is a magazine mounting head 390 (FIG. 4a), having latching means 389 for releasably mounting the transfer magazine 88 thereon. The magazine 88 is mounted on the mounting head 390 by a plurality of latch pins 392 of the latching means 389 which are operated by a latching cam 394 mounted on the forward end of the piston rod 396 of an air cylinder 398 which is mounted exteriorly of the housing 360 on the wall 384. The piston rod 396 extends through the center of the rotatable shaft 386 as will be observed, for example, in FIGS. 9 and 10. The cylinder 398 may be operated by a foot valve 476 (FIG. 2) or by a solenoid operated valve in the valve bank 338.

The rotatable shaft 386 is selectively rotatable by means of a rack 400 which engages a pinion 402 to move the shaft and the magazine 88 through a predetermined angle of rotation. The pinion 402 is mounted on the shaft 386 by a conventional overrunning clutch generally denoted by reference numeral 404 which allows the pinion to move in a clockwise direction (FIG. 9) freely on the shaft while driving the shaft 386 when moved in the opposite or counterclockwise direction. Thus, an upward movement of the rack 400 from the position illustrated by lines in full to the position illustrated in phantom in FIG. 9 will turn the pinion 402 without turning the shaft 386, while a downward movement of the rack 400 will index or rotate the shaft 386 causing the magazine 88 to move through a predetermined angle in a counterclockwise direction (FIG. 9). The rack 400 is mounted on the upper end of the piston 406 of an air cylinder 408 which is mounted within the housing 360 and is operated by a solenoid operated valve from the valve bank 338 in response to a signal from the tape reader 74. The upper limit of the stroke or travel of the rack 400 is determined by a stop 410 in the form of a stud mounted in the upper wall 412 of the housing 360. The upper wall 412 is pivotally mounted on a pair of pivot pins 414 so that when the rack 400 engages the stop 410 in its uppermost position, the top wall 412 will be rotated about the pivot point, actuating a limit switch 416 mounted within the housing by means of a switch actuator 418. The actuator 418 is normally out of engagement with the switch 416 since a spring 420 normally biases the wall 412 in a counterclockwise direction (FIG. 9). Actuation of the limit switch signals the appropriate valve solenoid in the valve bank 338 to lower the rack 400 and drive the rotatable shaft 386.

The index mechanism 370 will operate with either a two-, four- or six-pole transfer magazine supported on the head 390. Thus, a pair of index plates 422 and 424 are mounted on the shaft 386 by means of a hub plate 426 which is keyed to the shaft 386 and pinned to the index plates 422 and 424 in an appropriate manner, as for example by the dowel pin 428. Also mounted on the shaft 386 and fixed to the hub plate 426 is a locator plate 420, which includes a plurality of recesses 432 therein for co-operation with a detent arrangement 434 in order to eliminate any play in the shaft 386. The index plates 422 and 424 are respectively a six-pole plate and a two- or four-pole plate. Thus, index plate 422 has six equally spaced notches 436 about its periphery, while the index plate 424 has four such notches 438. A pawl 440 is provided to cooperate with the index plate 422, and another pawl 442 is provided to cooperate with the index plate 424. The pawls 440 and 442 are identical, being mounted in side-by-side relationship on a hinge pin 444 in the housing. The hinge pin is mounted in a block 472 which is supported on the housing wall 382 by supporting means 474.

In order to readily switch between six-pole and two- or four-pole capability, means is provided for activating either one or the other index plates 422 and 424. This means takes the form in the exemplification of a spring clip 446 which is mounted on the front wall 448 of the housing 360, the wall 448 having a pair of spaced openings therein corresponding to the position of the pawls 440 and 442 respectively. With the clip 446 in the position shown in FIGS. 2, 3, 9, and 10, i.e., with the clip to the right, a biasing pin 452 is forced through the opening in the wall 448; and the pawl 442 is thereby forced into engagement with the index plate 424. At this time the pawl 440 is, of course, withdrawn. The pawl 442, in conjunction with the index plate 424, allows the rotatable shaft 380 to rotate only 90 degrees each time the rack 400 is lowered. Thus, when the rack 400 moves upwardly, a camming pin 454, which is mounted on the back face of the rack 400 in a mounting block 456 and which extends transversely across the housing 360, contacts the forwardly biased pawl 442 moving it out of engagement with the notch 438 in the index plate 424. When the rack 400 reaches the stop 410, the limit switch 416 is actuated, and the cylinder 408 moves the rack downwardly. During the downstroke of the rack 400, with the pawl head 460 out of the notch 438 in plate 424, the pinion gear 402 is able to rotate the shaft 380. Further, as the rack 400 travels downwardly, the spring clip 446 causes the inner cam surface 458 of the pawl 442 to ride against the camming pin 454 while the pawl head 460 rides a cam surface 462 on the index plate 424 until the pawl head 460 falls into the next notch 438. This eliminates any further movement of the rack 400 and thereby any further movement of the shaft 386 and the transfer magazine 88. Concomitantly, a switch actuating pin 466 also carried in the mounting block 456 actuates a limit switch 468 which in turn activates the solenoid operated valve in the valve bank 338 which controls the air cylinder 408. In addition, in order to prevent the rack 400 from becoming disengaged from the pawl 402, the camming pin 454 extends between a pair of guide blocks 470 mounted on the housing wall 384.

As explained above, the notches 438 in the index plate 424 allow the transfer magazine 88 to rotate exactly 90 degrees (or 180 electrical degrees) each time the rack 400 is cycled. Thus, the magazine cage 375 is positioned to receive four separate coil groups from the coil form 62. If it is desired, however, to load two coil groups into an appropriate magazine, the tape reader is programmed to move the rack 400 through two cycles, thereby rotating the magazine 180 degrees (also 180 electrical degrees) before the cylinder 408 is inactivated. Alternatively, if it is desired to load six coil groups, for a six-pole stator, for example, the biasing pin 452 and spring clip are moved into engagement with the pawl 440 to render operative the index plate 422 which permits the magazine to rotate only 60 degrees (again 180 electrical degrees) each rack cycle.

Stripper assembly

The stripper assembly, generally denoted by reference numeral 56, is provided for pushing off or stripping the coils of a wound coil group from the coil form 62 into the cage 376 of the transfer magazine 88. The assembly 56 includes the previously mentioned stripper rod 78 which extends through the entire machine from the upstanding plate 230 to the plate 146 upon which the coil form sections are mounted. The stripper plate 79 is mounted at the forward end of rod 78 on a mounting leg 476 (FIGS. 5, 6), and a striker head 478 is mounted on the opposite end of rod 78 in position for actuation by the piston rod 480 of the stripper cylinder 76. The stripper cylinder 76 is carried in a housing 482 which is rotatably mounted, as by pin 484, on an L-shaped mounting plate 486 on the machine bed 94 rearwardly of the plate 230. The housing 482 includes a wire tube 486 and a pair of wire guides 488 and 490 enabling the wire 86 to be threaded therethrough over the pulley 128 and into the wire tube 132 carried in the spindle tube 134.

The stripper plate 79 is arcuate, conforming to and normally lying within the arcuate slot 168 between the upper coil form section 178 and the intermediate coil form section 180. The leg 476 extends through the slot 192 in the intermediate coil form portion 180 and the lower portion of the leg 378 as well as the front end of the rod 78 are movable longitudinally within a slot 286 in the lower coil form section 182. The stripper plate 79 is seen in its forwardmost position in FIG. 5 with the leg 476 in engagement with the forward end of the slot 286. It is moved to this position by the cylinder 76 upon a signal from the tape reader 74 after a coil group has been formed on the coil form 62. When the cylinder is actuated, the piston 480 moves out, engaging the striker head 478, sliding the rod 78 forwardly within the jump tube 148.

When the stripper plate 79 is moved longitudinally forwardly in the arcuate slot 170, it pushes the coils from the coil form 62 into the magazine cage 376. In order to accomplish this pushing action, the plate 79 has a plurality of steps separated by the shoulders 492 in order to enable it to engage the coils wound upon the various coil-forming stations of the coil form 62, since each coil wound upon the form is of increasingly larger size. Moreover, the forward end 494 of the plate 79 is of sufficient width to engage the two smallest coils wound upon the coil form 62 and push them therefrom when the stripper rod 78 is actuated, while the shoulders 492 engage and push the larger coils at the same time. A strap 496 extends between the opposite edges of the stripper plate 79 and over the upper coil form portion 178 in order to lend rigidity to the stripper plate and to insure that the wire 86 moves into the clamp means 84 by pushing the wire therein. When the appropriate number of coils have been wound upon the coil form 62 and after some of the turns of each coil have already been pushed by succeeding turns fully into the magazine slots (FIGS. 4a, 14, 15), the stripper plate 79 moves forwardly pushing the remainder of the turns of each coil from the coil form into the aligned slots 378 of the transfer magazine cage 376. The plate 79 moves, of course, below the lowermost blade 372 of the cage (see e.g., FIG. 5). When the leg 476 hits the end of the slot 286, the housing 482 is caused to tilt about the mounting pin 484, against the force of a retaining spring 498, actuating a limit switch 500 thereby actuating the cylinder 76 in the reverse direction to withdraw the piston 480. A coil spring 502, mounted about the rod 78 between a collar 504 and a lock ring 506, then forces the rod 78 back to its initial position, the rod 78 carrying the stripper plate 79 back within the slot 168. Thereafter, the coil form is withdrawn by the jump cylinder 228 to enable another group of coils to be wound thereon.

As explained above, the stripper plate forces the coils toward the rear of the slots 378 of the magazine cage 376, while some of the coil turns have actually been transferred into the slots prior to actuation of the stripper assembly since some turns slip off the coil form into the magazine cage slots as the coils are formed. Furthermore, as the magazine is rotated counterclockwise by the indexing mechanism 370, a helical guide bar 506 gradually forces the coils of each coil group to the rear of the cage slots 378.

Operation and method of developing coils

The operation of the machine 50 may be best appreciated by referring to the partial perspective views of FIGS. 12–17, inclusive, taken in conjunction with the above described views of the drawing. In FIG. 12 the coil-receiving assembly, e.g., transfer magazine 88 adapted to receive four coil groups in the exemplification, is shown unloaded in its withdrawn position, and the winding assembly is ready to begin a winding cycle. The frame 80 is lowered, with the upper peripheral edge 326 of the opening 85 in the masking plate 82 closely adjacent the first coil-forming station of the coil form 62 or arcuate surface 192. An end of the wire 86 has been threaded through the machine over the guide 122 in the flyer head 120 and is clamped in the clamp means 84. The magazine 88 is then moved forward into position adjacent the back face of the masking plate.

Upon actuation of the machine, the winding flyer head 120 will rotate counterclockwise (viewed from the right) from its off-center starting position (FIG. 12). When a predetermined number of turns 508 are wound on the coil form, such as six or ten turns, the clamp means 84 unclamps and the frame 80 raises so that the coil form may eventually move through the opening 85 into the transfer magazine 88.

The counting of flyer revolutions, unclamping and raising of the frame are controlled, of course, by the tape reader 74. In FIG. 14 it will be seen that the upper peripheral edge 326 of the masking plate opening 85 is above the path of travel of the coil form arcuate surface 204 and that the movable clamp arm 330 has been released. The flyer head 120 continues to rotate about the smallest coil-forming station of the coil form 62, placing turns of wire upon the inclined arcuate surfaces 205 and 207 as these surfaces are positioned across the path or the wire feeding plane of the winding flyer head 120 as it winds the wire 86. Moreover, as the coil form 62 is intermittently stepped by the mechanism 72 to place subsequent coil-forming stations in turn-receiving position, the wire will be wound in each case upon the inclined arcuate surfaces.

As the wire turns 508 are forced forwardly from the inclined surfaces onto the arcuate surfaces 192 and 194 by succeeding turns, some of the turns are pushed entirely off the coil form 62 into the slots 378 of the magazine cage (FIG. 14). Other turns will be located in slots 378 but are still supported by the form. When a predetermined number of turns are wound upon the first coil-forming station, with the flyer head 120 in the lower portion of its cycle, the coil form 62 is stepped forwardly until the inclined arcuate surface of the next larger coil-forming station is disposed in the wire feeding plane. A coil is then formed at this station in the manner already explained. This procedure is repeated until an entire coil group 510 is formed with the desired number of coils, (three and four coils in the exemplification) (FIG. 16), and the stripper plate 79 is actuated to push all the coils of the given coil group 510 fully into the transfer magazine 88, which then serves as the support for the coil group.

After the first coil group 510 is in place in magazine 88, the stripper plate and coil form 62 are pulled, and the wire, which has been drawn between the fixed clamp block 328 and clamp arm 330, is clamped by assembly 68 adjacent the first coil-forming station. The transfer magazine has in the meantime been indexed to place a preselected set of empty slots 378 in position to receive the next coil group. Additional coil groups of the desired polarity may subsequently be developed, as determined by the direction of flyer rotation. The above steps are repeated as desired to obtain the desired number of coils per pole and total number of coil groups. After a predetermined number of coil groups (four in the exemplification) are developed in the transfer magazine from the continuous strand of wire 86 (FIG. 17), the cutter arm 350 is actuated to cut the wire, and the magazine is withdrawn thereby to allow it to be removed from the mounting head 390.

If it is desired to have the individual turn lengths in a given coil varied as dictated by a slot configuration of the magnetic core or for other reasons, the turn lengths may be changed by shortening the axial length of each coil-forming station and moving the relative locations of the form sections 178, 182 during the generation of the turns of the given coil. For instance, section 182 may be attached to plate 64 such that it could be gradually and selectively moved toward and away from section 178 by a driver, such as a screw-feed arrangement. Thus, by controlling speed and direction of the feed, the turns could be progressively shortened, lengthened or selectively changed in either manner as desired in the same coil as the turns are being generated and fed into the coil-receiving assembly.

Referring now to FIGS. 18 and 20, a fully loaded magazine 88 is shown in position on the tooling section 32 of a convention coil injection machine 30 (FIG. 20). The notches 380 in the blades 372 provide a seat for each blade 372 on a corresponding blade 34 of the injection machine. At this time, a magazine stripper 512 is moved downwardly to quickly and efficiently push all four serially wound coil groups from the magazine cage 376 directly into the coil injection tooling, as the cage slots 378 are exactly aligned with the slots 36 in the tooling section. The cross members 514 between the inner and outer rings 516 and 518 contact the coils for moving the coils into the solts 36.

It will thus be seen from the foregoing that the present invention overcomes the deficiencies found in the prior art approaches previously discussed and provides an improved method for rapidly, efficiently, and automatically developing one or more coil groups which can be expeditiously loaded in coil-placing equipment, such as coil injection machines. Moreover, it will be recognized by those skilled in the art that the present invention has utility with equipment other than the axial coil injection machine of the exemplification.

Consequently, while in accordance with the patent statutes, I have described what at present is considered to be the preferred embodiments of my invention, it will be obvious to those skilled in the art that numerous changes and modifications may be made therein without departing from the invention, and it is therefore aimed in the appended claims to cover all such equivalent variations as fall within the true spirit and scope of the invention.

What I claim as new and desire to secure by Letters Patent of the United States is:

1. A method of developing at least one coil group in a coil-receiving assembly from electrically conductive wire for transfer of the coil group into slots of a magnetic core, the coil group including at least two serially connected wound coils each having a number of turns, the method comprising the steps of: clamping a portion of the wire adjacent the first step of a multi-step coil form having a path of travel; supporting the coil-receiving assembly adjacent the coil form in position to receive the coil group; generating sufficient turns of wire on the first step in a first direction of rotation so that upon release of the clamp, additional turns may be wound thereon, releasing the clamp and moving it out of the path of travel; generating additional turns of wire on the first step and concurrently moving at least some of the turns into the coil-receiving assembly; and removing the remaining turns from the coil form while placing said remaining turns in the coil-receiving assembly thereby developing at least one coil of the coil group therein.

2. The method of claim 1 wherein after forming the first wound coil upon the first step of the coil form, the steps of: moving the coil form and coil-receiving assembly relative to one another to locate a second larger step into turn-receiving position; thereafter generating from the same strand of wire a predetermined number of turns upon the second step to form a second wound coil which is larger than the first wound coil, and concurrently moving at least some of the turns on the second step into the coil-receiving assembly thereby developing a second coil in the same coil group as the at least one coil.

3. The method of claim 2 wherein after developing the at least one coil group in the coil-receiving assembly, the wire is clamped and the first step of the coil form is relocated in turn-receiving position; thereafter rotating the coil-receiving assembly and coil form relative to one another to locate the coil-receiving assembly in position to receive turns of another coil group; generating turns in a direction opposite the first direction of rotation of sufficient number on the first step so that upon release of the clamp additional turns can be wound thereon; releasing the clamp and moving the clamp out of the path of travel of the coil form; generating an additional predetermined number of turns on the first step and concurrently moving at least some of the turns from the first step into the coil-receiving assembly thereby developing at least one coil in the another coil group.

4. A method of developing at least two serially connected coil groups each comprising at least two serially connected wound coils of electrically conductive wire in a transfer magazine having coil receiving slots for transfer to a coil placement machine, said method comprising the steps of clamping an end of the wire adjacent the first step of a noncollapsible multi-step coil form having a path of travel, winding sufficient turns of wire on said first step in a first direction of rotation so that upon release of the clamp additional turns can be wound thereon, releasing the clamp and moving the clamp out of the path of travel of the coil form, winding an additional predetermined number of turns of wire upon the first step to form a first wound coil, moving the coil form to locate a second larger step into turn-receiving position and transferring at least some of the turns of the first wound coil into the coil-receiving slots of the transfer magazine.

5. The method of claim 4 wherein after forming the first wound coil upon the first step of the coil form and the coil form is moved to locate a second larger step into turn-receiving position, thereafter winding from the same strand of wire a predetermined number of turns upon said second step to form a second wound coil which is larger than the first wound coil, and transferring the first and second wound coils into first and second coil-receiving slots of the transfer magazine.

6. The method of claim 5 wherein after transferring at least the first and second wound coils into associated coil-receiving slots of the transfer magazine, the wire is clamped and the first step of the coil form is relocated in turn-receiving position; rotating the transfer magazine and coil form relative to one another to locate additional coil-receiving slots in position to receive coils; winding in a direction opposite the first direction of rotation a sufficient number of turns of wire on the first step so that upon release of the clamp additional turns can be wound thereon; releasing the clamp and moving the clamp out of the path of travel of the coil form; winding an additional predetermined number of turns of wire on the first step to form a wound coil; and transferring at least some of the turns of the last mentioned wound coil into the additional coil-receiving slots of the transfer magazine thereby developing in the transfer magazine at least two serially connected coil groups of different polarities.

References Cited

UNITED STATES PATENTS

| | | | |
|---|---|---|---|
| 2,836,204 | 5/1958 | Mason | 29—205 X |
| 2,934,099 | 4/1960 | Mason | 29—205 X |
| 3,036,603 | 5/1962 | Moore | 140—92 X |
| 3,101,180 | 8/1963 | Sadorf | 242—7 |
| 3,151,638 | 10/1964 | Hill | 140—92 |
| 3,263,309 | 8/1966 | Carmen et al. | 29—605 |
| 3,331,403 | 7/1967 | De Young | 140—92 X |

JOHN F. CAMPBELL, Primary Examiner

C. E. HALL, Assistant Examiner

U.S. Cl. X.R.

29—205, 596; 140—92.1; 242—7.09